Sept. 20, 1949.　　　　P. O. CARTUN　　　　2,482,400
TIPPING-OFF BURNER

Filed Aug. 15, 1946

INVENTOR:
PAUL O. CARTUN,
BY John H Anderson
HIS ATTORNEY.

Patented Sept. 20, 1949

2,482,400

UNITED STATES PATENT OFFICE 2,482,400

TIPPING-OFF BURNER

Paul O. Cartun, Cleveland Heights, Ohio, assignor to General Electric Company, a corporation of New York Application August 15, 1946, Serial No. 690,815

4 Claims. (Cl. 49—15)

This invention relates to apparatus for manufacturing electric lamps or similar evacuated devices which are exhausted through a vitreous tubular extension communicating with the interior of the bulb of the lamp, and more particularly to a burner used for heating the vitreous tubular extension, closing the wall thereof to hermetically seal a bulb, and simultaneously separating the vitreous exhaust tube from the evacuated bulb.

An object of my invention is to provide a new and improved gas burner.

Another object of my invention is to provide a device or burner which may be used for closing and substantially simultaneously separating a vitreous exhaust tube from an evacuated bulb.

A further object of my invention is to provide a gas burner which may, by hand or machine operation, heat, close and simultaneously separate a vitreous exhaust tube from an evacuated bulb.

Further features and advantages of my invention will appear from the following detailed description of species thereof.

For a better understanding of my invention reference may be had to the following description taken in connection with the accompanying drawings and its scope will be pointed out in the appended claims.

Figure 1:
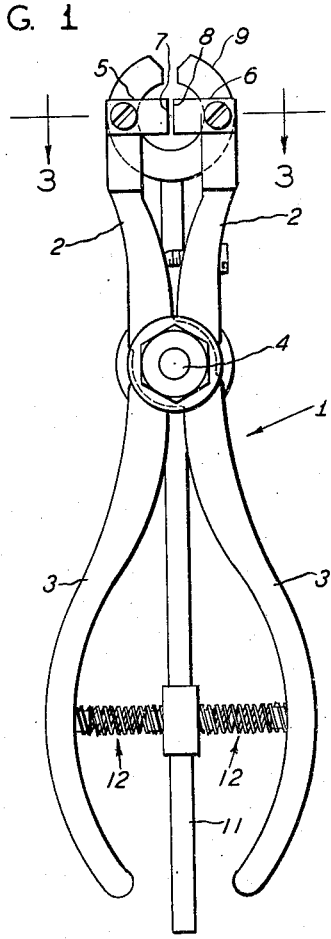
Figure 2:
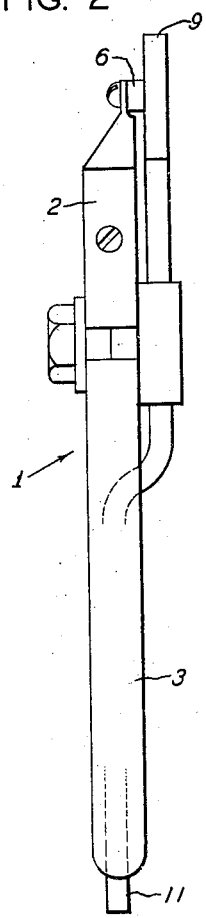
Figure 3:
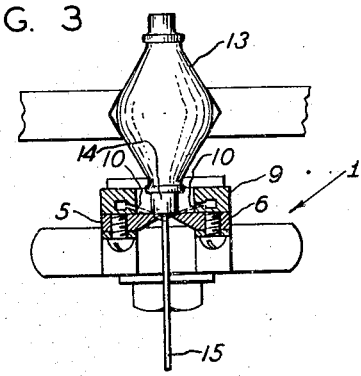

Fig. 1 is a plan view of the tipping burner with shearing or cutting elements attached in one embodiment of my invention. Fig. 2 is a view at right angles to the plane of Fig. 1. Fig. 3 is a horizontal section of the tipping burner, with cutting or shearing elements attached, on the line 3—3 of Fig. 1 in the direction of the arrows. A lamp is inserted in the burner to indicate the relative position of a ferrule to the burner.

Referring to Fig. 1 the tipping-off device therein comprises a plier or pincers 1 having elongated jaw and arm members 2 and 3, respectively, pivotally mounted on a common pivot pin 4. The jaw members 2 are provided with shearing elements 5 and 6 embodying cutting edges 7 and 8, respectively, mounted transverse or perpendicular to jaws 2 and in cutting or shearing relationship to each other. An internal ring burner 9 formed with a plurality of jets or burner openings 10 which may be for example one or two pairs of openings, staggered around its inner peripheral edge is mounted on the pivot pin 4 and lies adjacent to and parallel with the shearing elements 5 and 6. In this manner a sheet of flame is directed toward the center of the burner and at a position adjacent to and directly below the cutting edges 7 and 8 respectively of the shearing elements 5 and 6. The internal ring burner 9 is provided with a conduit 11 for connecting a gas supply to the burner. The conduit 11 is mounted on the pivot pin 4 and adjacent to the plier arms 3 and formed to lie longitudinally of and midway between the plier arms 3. Spring-biasing and positioning means 12, which for example may be a pair of springs capable of being compressed by hand or machine, are used for holding normally open the plier arms 3 and to maintain the burner 9 in centered relation to the shearing elements 5 and 6 at all times. These springs may be secured perpendicular to the conduit 11 and the inner face of the plier arms 3 by any suitable means.

Fig. 2 is a view at right angles to the plane of Fig. 1 showing more clearly the manner in which the internal ring burner 9 and the gas supply conduit 11 are mounted on pivot pin 4.

Fig. 3 is a horizontal section of the tipping burner, with cutting or shearing elements attached, on the line 3—3 of Fig. 1 in the direction of the arrows. A lamp 13 provided with a ferrule or skirted base 14 and an exhaust tube 15 projecting therefrom is inserted in the burner to indicate the relative position of ferrule to burner.

In accordance with my invention, I provide a tipping-off burner which will heat a vitreous tubular extension communicating with the interior of a vessel or bulb, close the tube wall, and substantially simultaneously separate the vitreous exhaust tube from the evacuated bulb. Accordingly, I provide a plier 1 having elongated jaw and arm members 2 and 3 mounted on a pivot pin 4. Shearing elements 5 and 6 are secured to the jaw members 2 in such a manner as to provide cutting edges 7 and 8, respectively, directly above and parallel to an internal ring burner 9. Heat may then be applied to the vitreous exhaust tube 15 at a point adjacent to the bulb neck for a period of time necessary to render the tube plastic. By reason of the softening of the glass it collapses under atmospheric pressure and closes the passageway through the tube. After the tube wall has collapsed and while the compressed portion is still plastic shearing elements 5 and 6 shear the compressed portion and more completely close the passage through the tube and consequently sever the bulb from the excess portion of the exhaust tube.

Generally speaking, I effect these desired results by means of the above described plier with an internal ring gas burner thereto attached which provides means to properly expand, direct, and regulate a current of gas to heat locally a portion of a vitreous exhaust tube and to simultaneously close and separate the vitreous exhaust tube from the evacuated bulb. By this means the vitreous exhaust tube may be sheared at the moment the glass is in a plastic condition and at a point just below the heated portion of the vitreous exhaust tube.

What I claim as new and desire to secure by Letters Patent of the United States is:

1. A tipping-off device for sealing a vitreous tube extending from a vessel, said device comprising in combination a plier having arm and jaw members pivotally mounted on a common pivot pin, said jaw members being provided with shearing elements, and in internal ring burner mounted on said pivot pin and lying adjacent to and parallel with said shearing elements, and biasing means connected between portions of said burner and plier to maintain said burner in centered relation to said shearing elements at all times.

2. A tipping-off device for sealing a vitreous tube extending from a vessel, said device comprising in combination a plier having arm and jaw members pivotally mounted on a common pivot pin, said jaw members being provided with shearing elements, an internal ring burner mounted on said pivot pin and lying adjacent to and parallel with said shearing elements, and a conduit for connecting a gas supply to said burner mounted on said pivot pin and adjacent to said arms and formed to lie longitudinally of and midway between said plier arms, and biasing means connected between said conduit and plier arms to maintain said burner in centered relation to said shearing elements at all times.

3. A tipping-off device for sealing a vitreous tube extending from a vessel, said device comprising in combination a plier having arm and jaw members pivotally mounted on a common pivot pin, said jaw members being provided with shearing elements, an internal ring burner mounted on said pivot pin and lying adjacent to and parallel with said shearing elements, and a conduit for connecting a gas supply to said burner mounted on said pivot pin and adjacent to said arms and formed to lie longitudinally of and midway between said plier arms, and biasing means extending between said conduit and each of said plier arms for holding said plier arms in a normally open position and maintaining said conduit in its position substantially midway between said plier arms at all times to thereby maintain said burner in centered relation to said shearing elements.

4. A device for sealing an evacuated electric lamp bulb, said device comprising in combination a plier having arm and jaw members pivotally mounted on a common pivot pin, said jaw members being provided with shearing elements, and an internal ring burner mounted on said pivot pin and lying adjacent to and parallel with said shearing elements, and biasing means connected between portions of said burner and plier to maintain said burner in centered relation to said shearing elements at all times.

PAUL O. CARTUN.

REFERENCES CITED

The following references are of record in the file of this patent:

UNITED STATES PATENTS

| Number | Name | Date |
| --- | --- | --- |
| 1,083,386 | Chapman | Jan. 6, 1914 |
| 1,346,528 | Brown | July 13, 1920 |
| 1,422,826 | Brown | July 18, 1922 |
| 1,456,639 | Lagier | May 29, 1923 |
| 1,457,491 | Beebe | June 5, 1923 |
| 2,032,688 | Dart | Mar. 3, 1936 |